US007962147B2

(12) United States Patent
Denney et al.

(10) Patent No.: US 7,962,147 B2
(45) Date of Patent: *Jun. 14, 2011

(54) METHODS FOR FLEXIBLE WIRELESS CHANNEL ASSOCIATION

(75) Inventors: Lisa V. Denney, Suwanee, GA (US); Gerald Grand, Cumming, GA (US); Yushan Lu, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 509 days.

This patent is subject to a terminal disclaimer.

(21) Appl. No.: 11/822,982

(22) Filed: Jul. 11, 2007

(65) Prior Publication Data
US 2007/0261086 A1     Nov. 8, 2007

Related U.S. Application Data

(63) Continuation of application No. 09/963,671, filed on Sep. 27, 2001, now Pat. No. 7,426,744.

(51) Int. Cl.
*H04Q 7/20* (2006.01)

(52) U.S. Cl. .............. 455/452.2; 455/434; 455/515; 455/452.1

(58) Field of Classification Search .......... 455/434, 455/452.2, 452.1, 502, 515, 422.1, 453, 463, 455/509; 725/95, 105, 111, 125; 370/431, 370/352, 468, 474, 329, 343
See application file for complete search history.

(56) References Cited

U.S. PATENT DOCUMENTS

| | | | |
|---|---|---|---|
| 5,696,765 A | 12/1997 | Safadi | |
| 6,028,933 A * | 2/2000 | Heer et al. | 713/169 |
| 6,041,051 A * | 3/2000 | Doshi et al. | 370/352 |
| 6,463,096 B1 | 10/2002 | Raleigh et al. | |
| 6,683,866 B1 | 1/2004 | Stanwood et al. | |
| 6,765,925 B1 | 7/2004 | Sawyer et al. | |
| 6,839,829 B1 | 1/2005 | Daruwalla et al. | |
| 7,017,176 B1 | 3/2006 | Lee et al. | |
| 7,426,744 B2 | 9/2008 | Denney et al. | |
| 7,519,082 B2 * | 4/2009 | Quigley et al. | 370/468 |
| 2001/0010096 A1 | 7/2001 | Horton et al. | |
| 2002/0038461 A1 | 3/2002 | White et al. | |
| 2002/0122395 A1 | 9/2002 | Bourlas et al. | |
| 2002/0144284 A1 * | 10/2002 | Burroughs et al. | 725/111 |
| 2007/0261087 A1 | 11/2007 | Denney et al. | |

FOREIGN PATENT DOCUMENTS

WO    WO 01/17167 A2    3/2001

OTHER PUBLICATIONS

European Search Report for European Application No. EP 02 25 6775, filed on Sep. 27, 2002.
Non-Final Office Action in U.S. Appl. No. 11/822,983, mailed Jul. 29, 2010, 8 pages.
Final Office Action in U.S. Appl. No. 11/822,983, mailed Jan. 6, 2011, 10 pages.

* cited by examiner

*Primary Examiner* — John Lee
(74) *Attorney, Agent, or Firm* — Sterne, Kessler, Goldstein & Fox P.L.L.C.

(57) ABSTRACT

A method of receiving information from one or more wireless uplink channels is provided. The method includes receiving information at a media access controller (MAC) from a first set of one or more wireless uplink channels in response to bandwidth allocation map (MAP) messages sent from the MAC and receiving information at the MAC from a second set of one or more wireless uplink channels in response to MAP messages sent by another MAC.

12 Claims, 4 Drawing Sheets

METHODS FOR FLEXIBLE WIRELESS CHANNEL ASSOCIATION

RELATED APPLICATIONS

This application is a continuation of U.S. Ser. No. 09/963,671, filed Sep. 27, 2001, now U.S. Pat. No. 7,426,744.

The following application of common assignee is related to the present application, has the same filing date as the present application, and is herein incorporated by reference in its entirety: "Systems For Flexible Wireless Channel Association," Ser. No. 11/822,983.

BACKGROUND OF THE INVENTION

1. Field of the Invention

The present invention relates generally to communications networking, and more specifically, to allocating upstream bandwidth within a communications network.

2. Related Art

Architects of communications networks continuously seek to achieve an optimal balance among various network characteristics. Such characteristics include bandwidth demand and quality of service parameters, such as latency, loss, or priority. For example, data-over-cable networks presently are expanding the variety of services traditionally provided to subscribers. In addition to television broadcasts, cable providers are offering telephony, messaging, and Internet services. As a result, additional bandwidth is needed to support the timely delivery of these services. Moreover, traditional cable broadcasts primarily require one-way communication from a cable service provider to a subscriber's home. As interactive or personal television services and other nontraditional cable services continue to be offered, communications media used to support one-way communications must now contend with an increased demand for bi-directional communications.

In a conventional cable television communications network, a communications device (such as a modem) requests bandwidth from a headend device prior to transmitting data to its destination. The headend device allocates bandwidth to the communications device based on availability and the competing demands from other communications devices. Typically, bandwidth is available to transmit signals downstream to the communications device. However in the upstream, bandwidth is more limited and must be arbitrated among the competing communications devices.

The downstream channel carries the information used by the communications devices to govern upstream transmissions. In a DOCSIS-compliant system, MAP messages are sent downstream to provide information about time slot assignments for the upstream channels associated with the downstream channel. In other words, the MAP messages assign one or more upstream channels to a specific communications device. The MAP messages also specify a time that may be used by the communications devices to transmit on an upstream channel and the type of data that may be transmitted. Moreover, these MAP messages are used by the headend device to predict the arrival of data from a communications device, the source of the data, and the type of data expected.

A headend device generally has one downstream channel and a finite number of upstream channels. To increment the quantity of upstream channels, the headend device can be chained to a second headend device through a master-slave interface. The first device runs in master mode, while the second device runs in slave mode. The master device sends MAP messages on its downstream channel across the master-slave interface to the slave device. The slave device, in turn, makes the MAP messages available to its upstream channels. If the master and slave devices each have, for example, eight upstream channels, using a master-slave interface permits the master device to receive data from a total of sixteen available upstream channels that can be used to support additional subscriber services.

Although a master-slave interface provides an avenue for supporting additional services, several drawbacks are attributable to this conventional approach. First, all upstream channels must be associated with a single downstream channel such that the upstream channels only receive MAP messages from the single downstream channel. Typically, master MAP messages are sent downstream from the master device to arbitrate asynchronous communications among the upstream channels of the slave device. If the slave device accepts the master MAP messages, no MAP message produced by the slave device can be used to arbitrate the upstream channels. In other words, if the downstream channel of the master device is associated with the upstream channels of the slave device, the downstream channel of the slave device cannot be used. Similarly, if less than the total available upstream channels of the slave device are associated with the downstream channel of the master device, the remaining upstream channels in the slave device cannot be used.

Conventional master-slave configurations are also inflexible and difficult to modify. The channel associations are fixed by the construction of the hardware. Therefore, the channel associations can only be changed by reconfiguring the hardware, namely to disable the master-slave interface. This cumbersome arrangement is not accommodating to changing load conditions in a dynamic, real time environment. The lack of system flexibility manifests an inefficient use of costly silicon and/or board resources.

Therefore, a communications device configured to support flexible channel association is needed to address the above problems.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

Table of Contents

I. Introduction
II. System Overview
Overview of Media Access Controller
IV. Upstream Channel Expansion and Association
V. Operational Flow for Flexible Channel Association
VI. Conclusion I. Introduction The present invention includes a method and system for associating one or more upstream channels with more than one downstream channel of a communications device, such as, but not limited to, the headend device within a cable communications network. In a conventional cable communications system, the headend allocates upstream bandwidth among remotely distributed cable modems. This is achieved by dividing the upstream bandwidth into a finite number of channels, and dividing each channel into distinct time slots, such as minislots. The quantity of channels is determined and/or limited by the design and physical layout of the headend. For example if the headend is configured to include eight upstream channels and one downstream channel, the headend would use the downstream channel to send MAP messages or the like to each cable modem. The MAP messages specify a channel and minislot that a cable modem may use to send upstream transmissions.

Conventionally, the headend is physically configured to restrict its upstream channels to being associated with a single downstream channel. In other words, only one downstream channel is permitted to send MAP messages to the cable modems to designate upstream bandwidth. If a master-slave interface is used to provide additional upstream channels, all upstream channels of the slave device must be associated with the same downstream channel, primarily the downstream channel of the master device. As such, only the downstream channel of the master device is permitted to send MAP messages to designate bandwidth among the cable modems. Thus, this configuration prevents a slave device from being able to associate its upstream channels with its own downstream channel. Moreover, since conventional channel associations are fixed by hardware construction, the channel associations cannot be easily modified to accommodate changing network requirements.

However, the present invention provides a programmable implementation of channel association that permits upstream channels to be reallocated to accommodate changing load conditions. By virtue of the master-slave configuration of the present invention, the slave device can select or deselect its own downstream channel or the downstream channel of the master device. In other words, a slave device of the present invention can independently select different sources for MAP information to be utilized on its upstream channels. Furthermore, the downstream channel within a slave device remains useful even if the downstream channel of the master is operational. As a result, the present invention permits silicon and/or board resources to be more fully utilized.

II. System Overview

Figure 1:
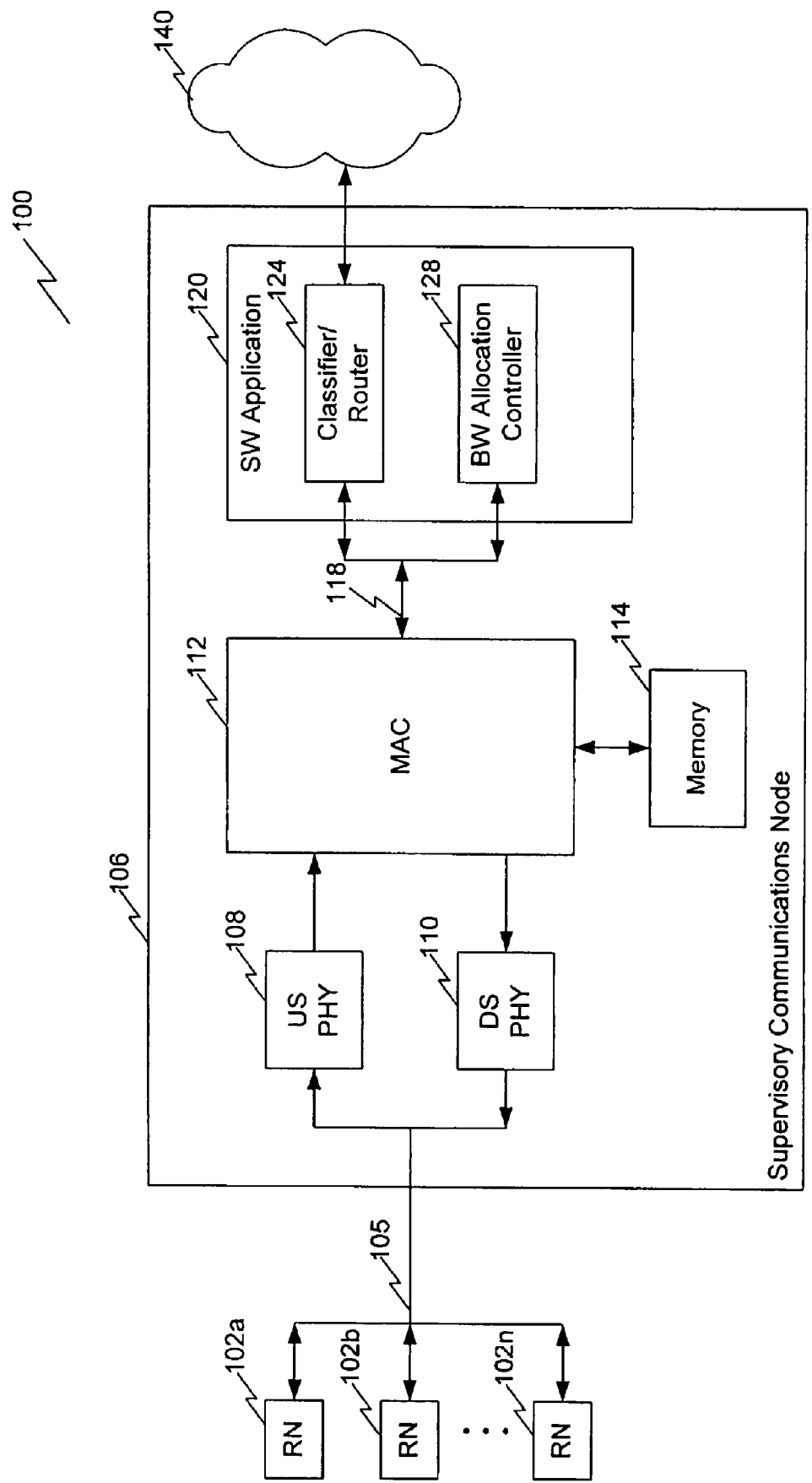
FIG. 1 illustrates a voice and data communications management system according to an embodiment of the present invention.

FIG. 1 illustrates a voice and data communications management system 100 according to an embodiment of the present invention. System 100 includes a supervisory communications node 106 and one or more widely distributed remote communications nodes 102a-102n (collectively referred to as "remote communications nodes 102").

System 100 can be implemented in any multimedia distribution network. Furthermore, it should be understood that the method and system of the present invention manage the exchange of voice, data, video, audio, messaging, graphics, other forms of media and/or multimedia, or any combination thereof.

Supervisory communications node 106 is centrally positioned to command and control interactions with and among remote communications nodes 102. In an embodiment, supervisory communications node 106 is a component of a headend controller for a cable communications network. As such, supervisory communication node 106 is a cable modem termination system (CMTS) or a part thereof. In an embodiment, at least one remote communications node 102 is a cable modem or a part thereof. In another embodiment, supervisory communications node 106 is a CMTS and at least one remote communications node 102 is a component of a television set-top box.

As part of a cable modem, remote communications node 102 is configurable to host one or more services to a subscriber. The services include telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, concerts, etc.), or the like.

Each remote communications node 102 is assigned one or more service identifier (SID) codes that supervisory communications node 106 uses to allocate bandwidth. A SID is used primarily to identify a specific flow from a remote communications node 102. However, as apparent to one skilled in the relevant art(s), other identifiers can be assigned to distinguish between the remote communications nodes 102 and/or the flow of traffic therefrom. Accordingly, in an embodiment, a SID or another type of identifier is assigned to identify a specific service affiliated with one or more remote communications nodes 102. In an embodiment, a SID or another type of identifier is assigned to designate a particular service or group of services without regard to the source remote communications node 102. In an embodiment, a SID or another type of identifier is assigned to designate a quality of service (QoS), such as voice or data at decreasing levels of priority, voice lines at different compression algorithms, best effort data, or the like. In an embodiment having multiple SIDs assigned to a single remote communications node, a primary SID or remote node identifier (RNID) is used to identify the remote communications node or a general flow from the remote communications node 102, and a service class identifier (SCID) is used to specify a particular flow, service, or quality of service.

In an embodiment, supervisory communications node 106 and remote communications nodes 102 are integrated to support protocols such as Internet Protocol (IP), Transmission Control Protocol (TCP), User Datagram Protocol (UDP), Real Time Transport Protocol (RTP), Resource Reservation Protocol (RSVP), or the like.

Communications management system 100 also includes an intemodal infrastructure 105. As shown in FIG. 1, intemodal infrastructure 105 provides interconnectivity among supervisory communications node 106 and remote communications nodes 102. Internodal infrastructure 105 supports wired, wireless, or both transmission media, including satellite, terrestrial (e.g., fiber optic, copper, coaxial, hybrid fiber-coaxial (HFC), or the like), radio, microwave, and/or any other form or method of transmission.

All communications transmitted in the direction from supervisory communications node 106 towards remote communications nodes 102 are referred to as being in the downstream. In an embodiment, the downstream is divided into one or more downstream channels. Each downstream channel is configured to carry various types of information to remote communications nodes 102. Such downstream information includes television signals, data packets (including IP datagrams), voice packets, control messages, and/or the like. In an embodiment, the downstream is formatted with a motion picture expert group (MPEG) transmission convergence sublayer. However, the present invention can be configured to support other data formats as would be apparent to one skilled in the relevant art. In an embodiment, supervisory communications node 106 implements time division multiplexing (TDM) to transmit continuous point-to-multipoint signals in the downstream.

The upstream represents all communications from remote communications nodes 102 towards supervisory communications node 106. In an embodiment, the upstream is divided into one or more upstream channels. Each upstream channel carries bursts of packets from remote communications nodes 102 to supervisory communications node 106. In the upstream, each frequency channel is broken into multiple assignable slots, and remote communications nodes 102 send a time division multiple access (TDMA) burst signal in an assigned slot.

As shown in FIG. 1, an embodiment of supervisory communications node 106 includes an upstream demodulator physical interface (US PHY) 108, a downstream modulator physical interface (DS PHY) 110, a media access controller (MAC) 112, a memory 114 and a software application 120. US PHY 108 forms the physical layer interface between supervisory communications node 106 and the upstream channel(s) of internodal infrastructure 105. Hence, all bursts from remote communications nodes 102 are received at US PHY 108. US PHY 108 processes the bursts to decompress and/or extract voice, data, requests, and/or the like from remote communications nodes 102.

Conversely, DS PHY 110 forms the physical layer interface between supervisory communications node 106 and the downstream channel(s) of internodal infrastructure 105. Hence, voice, data (including television or radio signals) and/or control messages that are destined for one or more remote communications nodes 102 are collected at DS PHY 110 and transmitted to the respective remote communications nodes 102. DS PHY 110 compresses and/or formats the information for downstream transmission.

MAC 112 receives the upstream signals from US PHY 108, or provides the downstream signals to DS PHY 110, as appropriate. MAC 112 operates as the lower sublayer of the data link layer of supervisory communications node 106. As described greater detail below, MAC 112 supports fragmentation, concatenation, and/or error checking for signals transported over the physical layer.

Memory 114 interacts with MAC 112 to store the signals as they are processed by MAC 112. Memory 114 also stores various auxiliary data used to support the processing activities. Such auxiliary data includes security protocols, identifiers, rules, policies and/or the like, as described in greater details below.

MAC 112 is connected to software application 120 over bus 118, which is a convention bidirectional bus. Software application 120 operates on one or more processors to receive control messages, voice and/or data from MAC 112, and implement further processing. As shown, software application 120 includes a classifier/router 124 and a bandwidth (BW) allocation controller 128. BW allocation controller 128 manages upstream and/or downstream modulation and bandwidth allocation. Classifier/router 124 provides rules and policies for classifying and/or prioritizing communications with remote communications nodes 102. Classifier/router 124 also routes signals from remote communications nodes 102 to a destined location over backbone network 140.

Backbone network 140 is part of a wired, wireless, or combination of wired and wireless local area networks (LAN) or wide area networks (WAN), such as an organization's intranet, local internets, the global-based Internet (including the World Wide Web (WWW)), private enterprise networks, or the like. As such, supervisory communications node 106 utilizes backbone network 140 to communicate with another device or application external to communications management system 100. The device or application can be a server, web browser, operating system, other types of information processing software (such as, word processing, spreadsheets, financial management, or the like), television or radio transmitter, another remote communications node 102, another supervisory communications node 106, or the like.

III. Overview of Media Access Controller

The present invention permits supervisory communications node 106 to be re-configured to increase its quantity of upstream and/or downstream channels. Specifically, the interface between US PHY 108 and MAC 112 provides a finite number of upstream channels. In an embodiment, each US PHY 108 receives a single upstream channel, and supplies upstream bursts to MAC 112 over a pin connection. For example, if eight US PHYs 108 are connected to MAC 112 through separate pins, MAC 112 would operate to receive eight upstream channels. Therefore, the quantity of channels can be increased or decreased by incrementing or decrementing, respectively, the number of US PHYs 108. Although each US PHY 108 typically supports a single upstream channel, however, for simplicity of illustration, the term "US PHY 108," as used herein, refers to one or more US PHY 108 devices and therefore handles multiple upstream channels, unless expressly stated otherwise.

Figure 2:
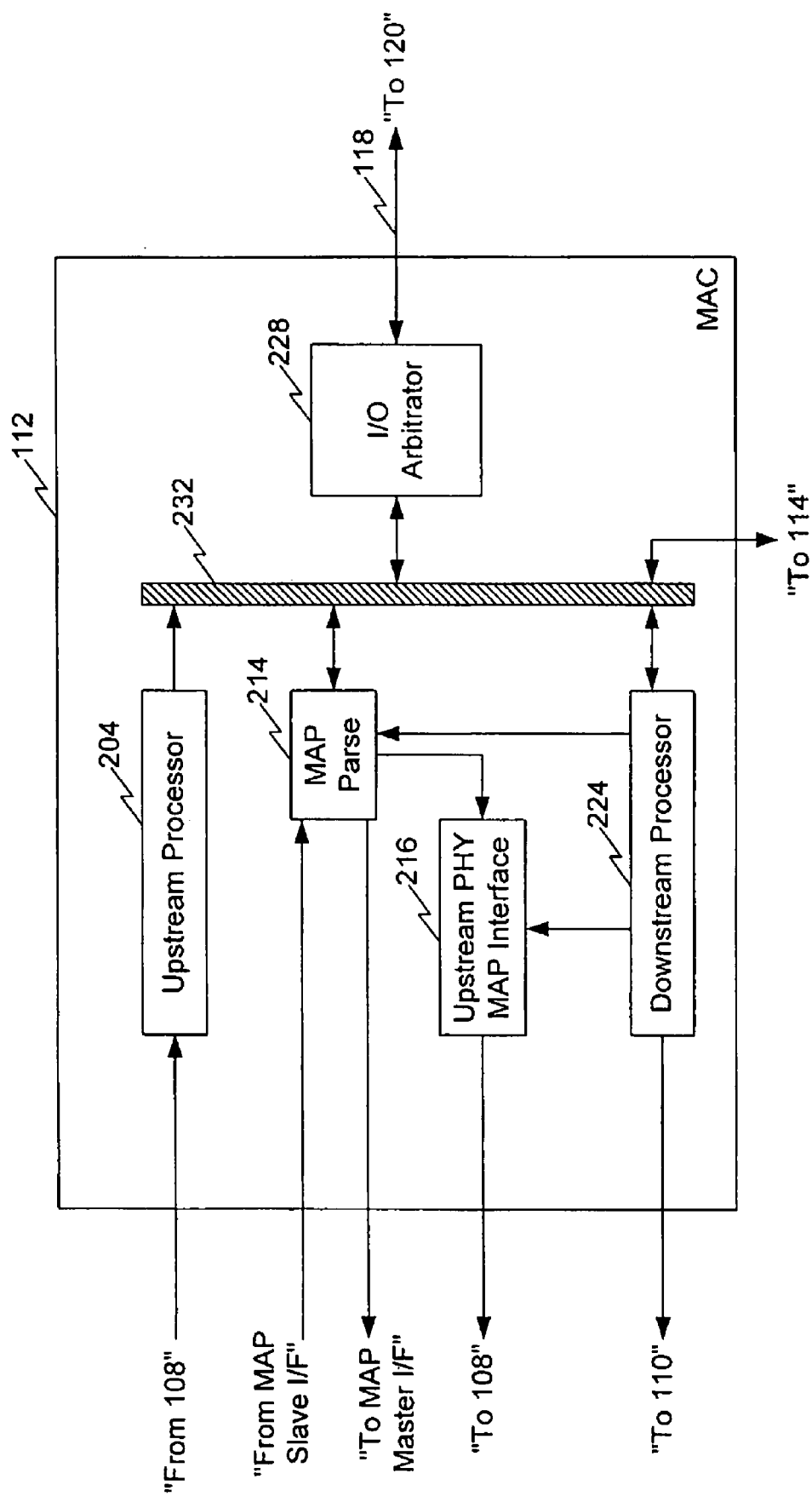
FIG. 2 illustrates a media access controller according to an embodiment of the present invention.

Thus, the quantity of upstream channels is restricted by hardware design. However, a master interface and/or a slave interface permit additional channels to be associated with MAC 112. FIG. 2 illustrates an embodiment of MAC 112 configured for upstream channel expansion via a master and/or slave interface. In an embodiment, MAC 112 is an integrated circuit within a CMTS (shown in FIG. 1 as supervisory communications node 106). Accordingly, MAC 112 performs a variety of protocol processes defined by the Data Over Cable System Interface Specification (DOCSIS) for governing cable communications. The DOCSIS protocol processing includes interfacing with US PHY 108 and DS PHY 110, encrypting and decrypting data, storing packet data in queues, and/or DMA functions to exchange data with memory 114. Although the present invention is described in reference to DOCSIS protocol processing, it should be understood that the present invention is intended to be inclusive of other types of communication protocols governing multimedia distribution networks.

FIG. 2 shows the components of MAC 112 according to an embodiment of the present invention. MAC 112 includes an upstream processor 204, a MAP parse 214, a downstream PHY MAP interface (I/F) 216, an downstream processor 224, and an input/output (I/O) arbitrator 228. The MAC components communicate over bus 232. In an embodiment, bus 232 is an internal-only split transaction bus with built-in arbitration to allow the components to communicate with each other with a shared memory interface to memory 114.

Upstream processor 204 receives signals (including voice, data, bandwidth requests, and/or the like) from US PHY 108. Upstream processor 204 prioritizes and processes the signals according to DOCSIS protocols. Upon completion, upstream processor 204 forwards the signals to a priority queue for further processing. The priority queues are located in memory 114.

Bus 232 supports the transfer of signals among upstream processor 204, memory 114, and I/0 arbitrator 228. I/0 arbitrator 228 manages the flow of signals between MAC 112 and software application 120. Particularly, I/0 arbitrator 228 interfaces with bus 118 to deliver the signals to software application 120. I/O arbitrator 228 also receives signals from software application 120. Such signals include broadcast signals, control messages, and/or the like to be transported downstream. These signals are typically stored in memory 114 until MAC 112 is ready to process them.

Downstream processor 224 interacts with bus 232 to receive the downstream signals from memory 114. Downstream processor 224 formats and prepares the signals for delivery to DS PHY 110. If the downstream signals include MAP messages, the MAP messages also are delivered to DS PHY 110. The MAP messages subsequently are transmitted to the designated remote communications node(s) 102 to arbitrate the upstream channels of MAC 112.

Downstream processor 224 also is connected to MAP parse 214, and permits MAP parse 214 to monitor the downstream signals. Accordingly, the MAP messages are detected or extracted from the downstream signals by MAP parse 214. Additionally, MAP parse 214 receives MAP messages from the MAP slave interface to MAC 112. On receipt of MAP messages from downstream processor 224 and/or the MAP slave interface, MAP parse 214 forwards the MAP messages to MAP I/F 216. MAP I/F 216 forwards the MAP messages to US PHY 108. US PHY 108 uses the information to anticipate and/or demodulate the next upstream burst from remote communications nodes 102a-102n.

MAC 112 is configured to operate, on a channel-by-channel basis, as a master device for a second MAC 112 operating as a slave device, and vice versa. As such, MAP parse 214 extracts and/or filters MAP messages that are designated for the slave MAC 112. MAP parse 214 sends the MAP messages over the MAP master interface to the slave MAC 112.

Hence, FIG. 2 illustrates an embodiment of a MAC 112 capable of increasing the quantity of channels associated with supervisory communications node 106. As described, MAC 112 sends MAP messages to designate the upstream bursts received by US PHY 108. A master interface and a slave interface permit additional channels to be associated with MAC 112. As such, if MAC 112 is restricted to servicing, for example, eight upstream channels, the master and/or slave interfaces can be used to connect a second MAC 112 make available an additional eight upstream channels.

IV. Upstream Channel Expansion and Association

The method and system of the present invention permit the association one or more upstream channels with more than one downstream channel. For example, a conventional cable headend device only allows its upstream channels to be associated with one downstream channel. Additionally if a master-slave interface is used to increase the number of available upstream channels, all upstream channels of the slave device must be associated with the same downstream channel, primarily the downstream channel of the master device. Moreover, conventional channel associations are fixed by hardware construction.

However, the present invention provides a programmable implementation of channel association that permits upstream channels to be reallocated to accommodate changing load conditions. Referring to the master and slave interfaces of FIG. 2, MAP parse 214 is enabled to switch between slave and master modes to select or deselect either the downstream channel of its governing MAC 112, or the downstream channel of another MAC 112. The expression "governing MAC 112" as used herein refers to the actual MAC 112 that MAP parse 214 is a component thereof, as opposed to being coupled thereto via a master or slave interface.

Figure 3:
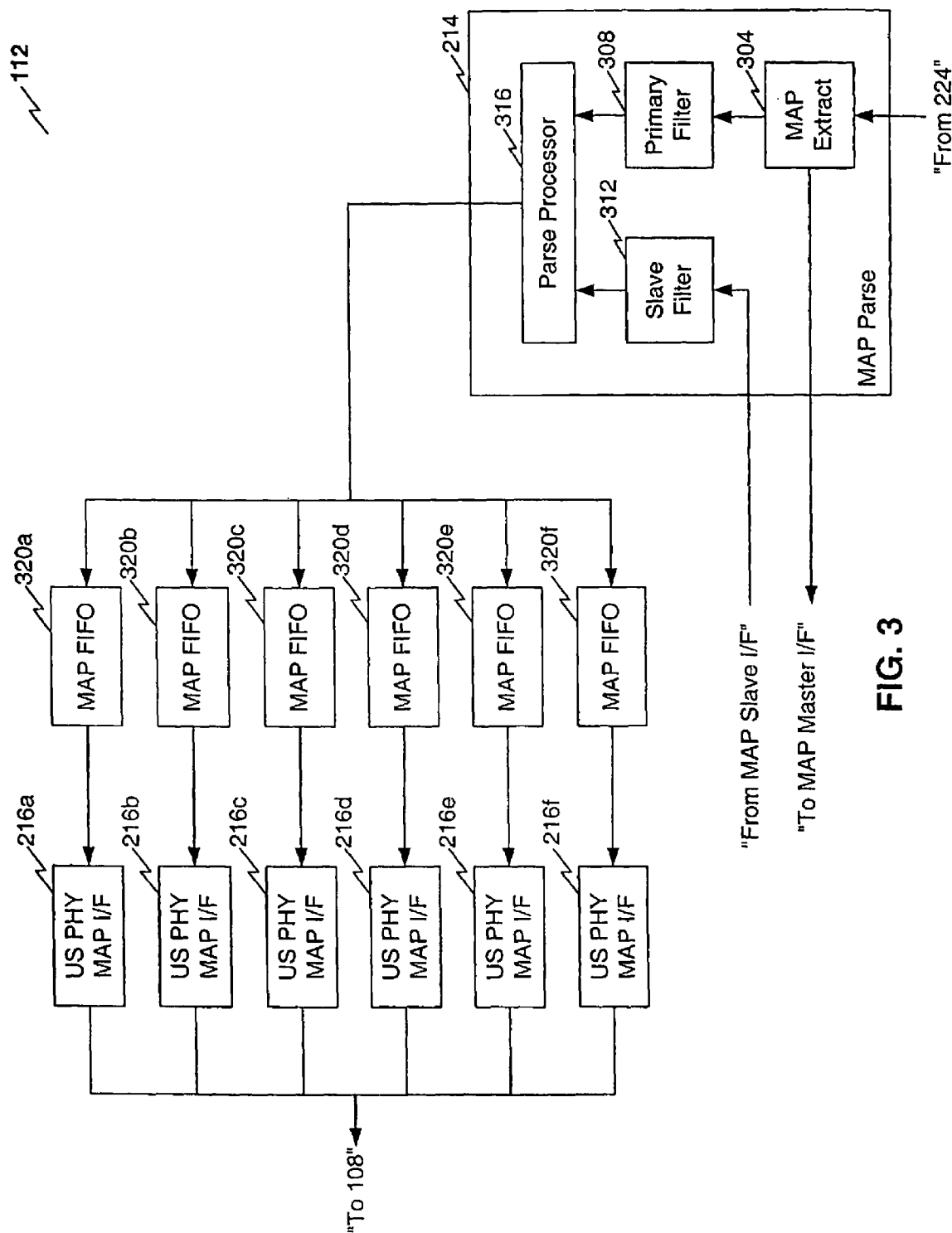
FIG. 3 illustrates a media access controller according to another embodiment of the present invention.

FIG. 3 shows the components of MAP parse 214 according to an embodiment of the present invention. MAP parse 214 includes a MAP extract 304, a primary filter 308, a slave filter 312, and a parse processor 316. MAP extract 304 monitors the downstream signals as they are being processed by downstream processor 224. If MAP messages are detected in the downstream signals, MAP extract 304 sends the MAP messages to either primary filter 308 and/or a slave device over the MAP master interface. Primary filter 308 processes the MAP messages by upstream channel and decides whether to accept the MAP message for the designated upstream channel.

Similarly, slave filter 312 receives MAP messages from the MAP slave interface to MAC 112. In an embodiment, MAC 112 operates as a slave device to another MAC 112 that is operating as a master device. MAP messages from the master MAC 112 are transmitted over the MAP slave interface to slave filter 312. Slave filter 312 sorts the MAP message by upstream channel and determines whether to accept the MAP message. If slave filter 312 accepts the MAP messages, slave filter 312 synchronizes the signal carrying the MAP messages to a local system clock for MAC 112.

In an embodiment, primary filter 308 and slave filter 312 both contain registers the enable the filters to decide whether to accept or reject MAP messages. As such, the registers, in essence, identify whether the properties of a particular upstream channel can be configured indirectly by a remote MAC 112 or by the local governing MAC 112. In an embodiment, the registers include a channel identifier that designates an upstream channel. The registers also includes an interface bit that enables or disables the master mode or slave mode. In master mode, the interface bit is set to enable the local MAC 112 to directly configure the upstream channel designated by the channel identifier. In slave mode, the interface bit is set to enable the remote MAC 112 to indirectly configure the upstream channel designated by the channel identifier.

In other words, the registers decide whether primary filter 308 or slave filter 312 will accept or reject MAP messages from MAP extract 304 or the MAP slave interface, respectively. When the registers are set to permit primary filter 308 to accept MAP messages from MAP extract 304, MAC 112 is operating in master mode for the designated upstream channels. As such, the accepted MAP messages from primary filter 308 are forwarded to parse processor 316. However, when the registers are set to permit slave filter 312 to accept MAP messages from the MAP slave interface, MAC 112 is operating in slave mode for the designated upstream channels. As such, the accepted MAP messages from slave filter 312 are forwarded to parse processor 316.

Parse processor 316 receives MAP messages that have been accepted, authorized, and/or authenticated by slave filter 312 and/or primary filter 308. Parse processor 316 prepares the MAP messages to be transmitted to US PHY 108. In an embodiment, parse processor 316 sends the entire MAP message to US PHY 108. In another embodiment, parse processor 316 translates the MAP messages to identify or specify the SID, interval usage code (IUC), length, minislot count, and/or minislot offset for each incoming burst. As such, only this data is sent to US PHY 108.

Prior to sending the MAP messages to US PHY 108, parse processor 316 forwards the MAP messages to MAP FIFO 320a-320f. The MAP messages for each upstream channel are stored in an appropriate MAP FIFO 320a-320f that is designated for each upstream channel. In this embodiment, six upstream channels are included; however as described above, the present invention permits more or less upstream channels to be included as determined by the hardware configuration.

Subsequently, the MAP FIFO 320a-320f are emptied by the associated US PHY MAP I/F 216a-216f. The MAP messages are then transferred to US PHY 108. Although only one US PHY 108 is illustrated in FIG. 1, in an embodiment, a US PHY 108 is provided for each channel. Therefore, referring to FIG. 3, each US PHY MAP I/F 216a-216f is likewise linked to a separate US PHY 108 for the designated upstream channel.

FIG. 3 only illustrate a single master interface and slave interface for sending and receiving, respectively, MAP messages. However, the present invention includes configurations having multiple slave and/or master devices. As such, a plurality of MAP master interfaces can be included to permit MAP messages to be transmitted to a plurality of slave MACs 112. Likewise, a plurality of slave filters 312 can be disposed in MAP parse 214 and operable to receive MAP messages from a plurality of master MACs 214. Registers are provided to determine whether the MAP messages are accepted or rejected from each of the plurality of master MACs 214. Thus, MAC 214 is configurable to support a single or multiple slave and/or master devices.

V. Operational Flow for Flexible Channel Association

Figure 4:
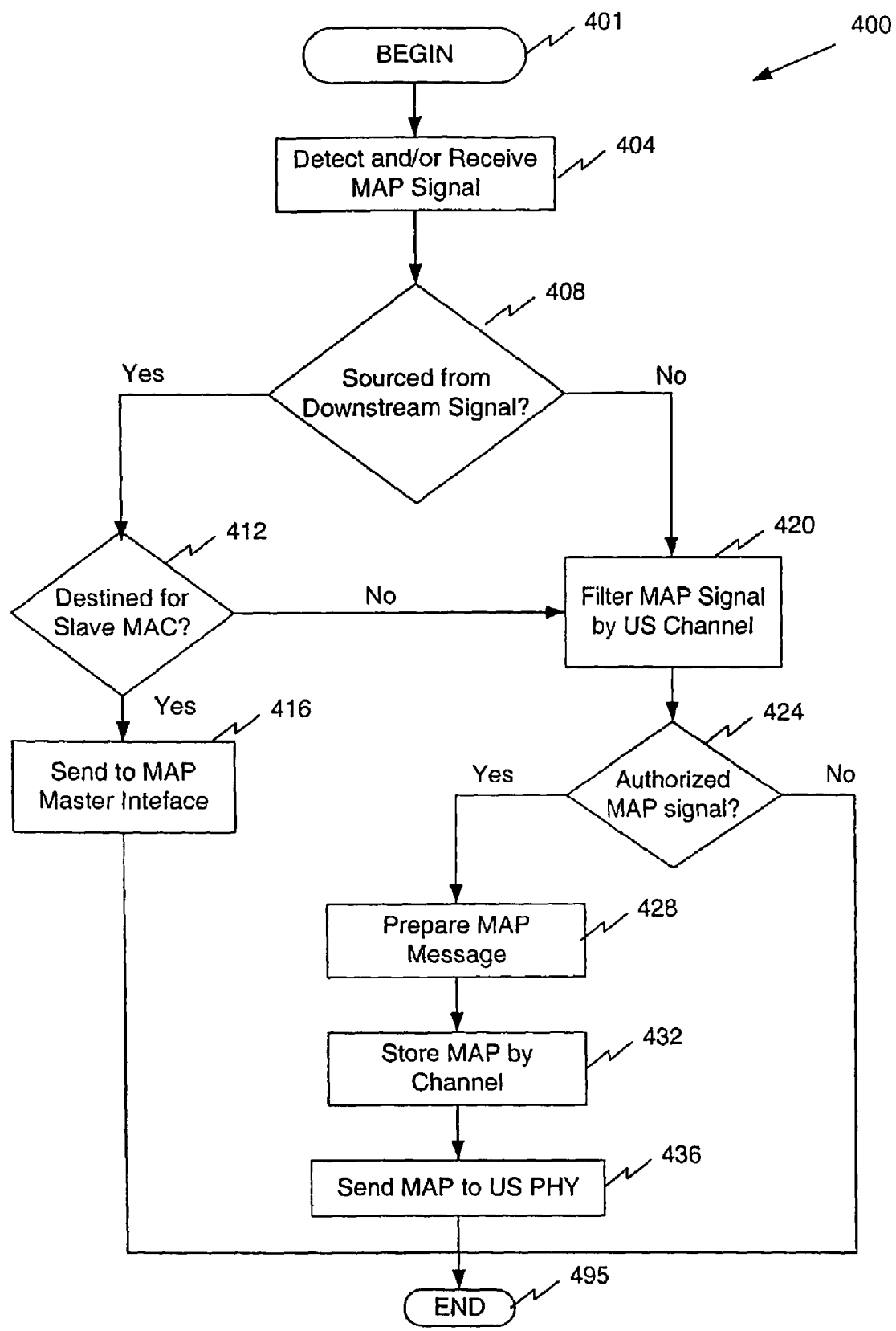
FIG. 4 illustrates an operational flow diagram for altering the upstream channel associations according to an embodiment of the present invention.

The present invention implements a flexible channel association scheme that permits upstream channels of MAC 112 to be reallocated as required. Referring to FIG. 4, flowchart 400 represents the general operational flow of an embodiment of the present invention. More specifically, flowchart 400 shows an example of a control flow for managing the channel association of one or more upstream channels of MAC 112.

The control flow of flowchart 400 begins at step 401 and passes immediately to step 404. At step 404, MAP parse 214 (shown in FIG. 2) detects or receives a MAP signal containing MAP messages from a primary or secondary source. Referring back to FIG. 2, downstream processor 224 serves as the primary source of MAP signals delivered to MAP parse 214, and a MAP slave interface serves as the secondary source of MAP signals.

At step 408, MAP parse 214 processes the MAP signal according to source. If the MAP signal arrives from the primary source, the control flow passes to step 412. However, if the MAP signal arrives from the secondary source, the control flow passes to step 420.

Considering the primary source, downstream processor 224 formats and prepares downstream signals that are destined for remote communications nodes 102, as described above in reference to FIG. 2. If the downstream signal includes MAP messages, MAP extract 304 (shown in FIG. 3) detects and/or receives the MAP messages from the downstream signal.

At step 412, MAP extract 304 determines whether the MAP signal is intended to govern the upstream channels of a slave MAC 112, in addition to or in lieu of governing the upstream channels of its own MAC 112. The destination of the MAP signal is determined by reading a header frame or like information including in the MAP signal.

If the MAP signal is destined for a slave MAC 112, the control passes to step 416. At step 416, the MAP signal is sent over the MAP master interface to the other MAC 112 where the MAP signal is received by a MAP parse 214 resident to the other MAC 112.

On the other hand, control passes to step 420 if the MAP signal is either not destined for a slave MAC 112 or destined for both a slave MAC and one or more upstream channels of the local governing MAC 112. At step 420, the MAP signal is driven to primary filter 308 (shown in FIG. 3).

Referring back to step 408, control also passes to step 420 if the MAP signal enters MAP parse 214 from the secondary source. With regard to the secondary source, the MAP slave interface drives MAP signals from a remote MAC 112 to slave filter 312 (shown in FIG. 3). Therefore, MAP parse 214 is operable to receive MAP signals into either slave filter 312 or MAP extract 304. As a master device, MAC 112 receives MAP signals in its MAP extract 304, and when operating in slave mode, MAC 112 receives MAP signals in its slave filter 312.

At step 420, slave filter 312 or primary filter 308 determines the upstream channel(s) the MAP signal is intended to control. This data is determined by reading a header frame or like information included in the MAP signal. Accordingly, the MAP signal is filtered, sorted, and/or queued by upstream channel.

At step 424, primary filter 308 or slave filter 312 authenticates the MAP signal to determine whether the primary source (i.e., the governing MAC 112) or secondary source (i.e., a remote MAC 112), respectively, has the authority to send MAP signals to arbitrate the designated upstream channel(s). In other words, on a channel-by-channel basis, slave filter 312 or primary filter 308 determines whether MAC 112 will function as a slave device or master device.

In an embodiment, slave filter 312 or primary filter 308 uses registers to authenticate the MAP signal. As such, the registers are used to determine which source has the authority to send a MAP signal to the designated upstream channel(s). As discussed above in reference to FIG. 3, the registers are used to compare the MAP signal to channel and/or interface bits for the designated upstream channel(s). Software application 120 provides authorization instructions to set and/or update the channel and/or interface bits to identify which source(s) has authority to configure and/or assign the upstream channels. In an embodiment, the registers are updated, in real time or near term, as the authorization is specified or changed. Authorization is specified or changed to optimally balance the load requirements of the application(s) being serviced. This includes the application(s) being serviced by either the remote MAC 112 or local MAC 112.

If the source of the MAP signal lacks authority for the designated upstream channel, the MAP signal is rejected. Hence the control flow passes to step 495. Additionally in an embodiment, if no channel and/or interface bit is available for the designated upstream channel, the MAP signal is rejected and the control flow passes to step 495.

If, on the other hand, the source is authorized for the designated upstream channel, the control flow passes to step 428. At step 428, parse processor 316 receives MAP signals that have been accepted, authorized, and/or authenticated by slave filter 312 and/or primary filter 308. Parse processor 316 processes the MAP messages (i.e., MAP information elements) from the MAP signals, and prepares the MAP messages to be transmitted to US PHY 108. In an embodiment, parse processor 316 prepares the entire MAP message to be sent to US PHY 108. In another embodiment, parse processor 316 translates the MAP messages to identify or specify the SID, IUC, length, minislot count, and/or minislot offset for each incoming burst. As such, only this data prepared to be sent to US PHY 108.

At step 432, parse processor 316 drives the MAP messages to the appropriate MAP FIFO 320a-320f. MAP messages for each upstream channel are stored in an appropriate MAP FIFO 320a-320f that is designated for each upstream channel.

At step 436, MAP FIFO 320a-320f are emptied at the appropriate time to send the MAP messages to the designated US PHY MAP I/F 216a-216f for delivery to US PHY 108. The MAP messages are then transferred to US PHY 108. After the MAP messages have been transmitted, or rejected as described above, the control flow ends as indicated by step 495. Accordingly, the control flow of flowchart 400 describes a process for assigning and re-assigning channel associations in response to changing load demands.

The present invention allows the association of groups of upstream channels with more than one downstream channel of a communications device. It also allows the associations to be changed. Specifically, MAC 112 can independently select different sources for MAP information for each upstream channel it controls. Thus, the downstream channel controlled by the slave device is still useful. The present invention allows significantly greater flexibility in the association of upstream channels and downstream channels at a MAC 112. Moreover, the present invention features improved MAP master-slave functionality. The improved flexibility makes the system more adaptable and improves the utilization of silicon and/or board resources.

VI. Conclusion

FIGS. 1-4 are conceptual illustrations that allow an easy explanation of the present invention. That is, the same piece of hardware or module of software can perform one or more of the blocks. It should also be understood that embodiments of the present invention can be implemented in hardware, software, or a combination thereof. In such an embodiment, the various components and steps would be implemented in hardware and/or software to perform the functions of the present invention.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Moreover, it should be understood that the method and system of the present invention should not be limited to transmissions between cable modems and headends. The present invention can be implemented in any multi-nodal communications environment governed by a centralized node. The nodes can include communication gateways, switches, routers, Internet access facilities, servers, personal computers, enhanced telephones, personal digital assistants (PDA), televisions, set-top boxes, or the like. Thus, the present invention should not be limited by any of the above-described exemplary embodiments, but should be defined only in accordance with the following claims and their equivalents.

What is claimed is:

1. A method of receiving information at a single media access controller ("MAC"), comprising:
   receiving first information at the MAC from one or more wireless uplink channels of the MAC in response to a first bandwidth allocation map ("MAP") message sent from the MAC, when the MAC is in a first mode; and
   receiving second information at the MAC from one or more wireless uplink channels of another MAC in response to a second MAP message sent by the another MAC, when the MAC is in a second mode.

2. The method according to claim 1, further comprising:
   sending third information from the MAC to a downlink channel, the third information including MAP messages, wherein each MAP message of the MAP messages is associated with an uplink channel of the one or more uplink channels of the MAC or with an uplink channel of the one or more uplink channels of the another MAC.

3. The method according to claim 1, further comprising:
   sending the second MAP message to the another MAC over a master interface.

4. The method according to claim 3, wherein the second MAP message is received at a filter of the another MAC.

5. The method according to claim 1, wherein the second mode is a master mode.

6. The method according to claim 1, wherein the first mode and the second mode are different.

7. The method according to claim 1, further comprising:
   authenticating the first MAP message based on information in registers of the MAC.

8. The method according to claim 7, further comprising:
   updating the information in the registers of the MAC.

9. The method according to claim 1, further comprising:
   formatting the first MAP message for a designated uplink channel of the one or more uplink channels of the MAC.

10. The method according to claim 1, further comprising:
    queuing the first MAP message in a queue.

11. The method according to claim 1, wherein each of the MAC and the another MAC comprises a primary filter and a secondary filter, further comprising: receiving the first MAP message at the primary filter of the MAC, wherein the second MAP message is received at the secondary filter of the another MAC.

12. The method according to claim 11, wherein the primary filter includes registers that store information, further comprising:
    authenticating the first MAP message based on the information in the registers.

* * * * *